United States Patent
Dendukuri et al.

(10) Patent No.: US 7,688,809 B2
(45) Date of Patent: Mar. 30, 2010

(54) MEDIA INACTIVITY DETECTION IN VOIP NETWORKS

(75) Inventors: Raghunath Dendukuri, Milpitas, CA (US); Parameswaran Kumarasamy, San Jose, CA (US); Mohammed Taher Shaikh, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1001 days.

(21) Appl. No.: 11/417,763

(22) Filed: May 3, 2006

(65) Prior Publication Data
US 2007/0274284 A1 Nov. 29, 2007

(51) Int. Cl.
*H04L 12/66* (2006.01)
(52) U.S. Cl. .................................. 370/352; 370/395.2
(58) Field of Classification Search ................ 370/352
See application file for complete search history.

(56) References Cited

U.S. PATENT DOCUMENTS

| | | | |
|---|---|---|---|
| 2005/0123126 A1* | 6/2005 | Gandhi et al. | 379/377 |
| 2006/0126589 A1* | 6/2006 | Sayeedi | 370/338 |
| 2007/0064681 A1* | 3/2007 | Boillot et al. | 370/352 |

OTHER PUBLICATIONS

H. Schulzrinne et al. "RTP: A Transport Protocol for Real-Time Applications", Standard Tracks, RFC 3550, Jul. 2003 (pp. 1-89).

* cited by examiner

Primary Examiner—Creighton Smith
(74) Attorney, Agent, or Firm—Haynes and Boone, LLP.

(57) ABSTRACT

Systems and techniques to determine that a VoIP call is an inactive media call. One or more counters may be used to determine information indicative of an elapsed time since the last valid media packet sent/received. When the elapsed time exceeds a threshold time, the call is determined to be an inactive media call. The call may be designated as inactive, may be terminated, or other action may be taken based on the determination that the call is an inactive media call.

23 Claims, 5 Drawing Sheets

MEDIA INACTIVITY DETECTION IN VOIP NETWORKS

BACKGROUND

1. Field of Invention

This invention generally relates to Voice Over Internet Protocol (VoIP) communication and, more particularly, to detection of defective connections.

2. Related Art

In a VoIP system, voice information is transmitted as packets over the Internet. FIG. 1 shows a schematic diagram of a VoIP system 100, according to the prior art.

First telephone 105 at location A may be used to place a call to a second telephone 106 at location B. First telephone 105 uses VoIP by sending signal information and voice information over network 130 using VoIP gateway device 110 and router 120. Gateway device 110 includes memory 111 and one or more processors 112 to implement VoIP processing. Router 120 includes a network interface 121 to interface with network 130. Device 110 and router 120 may be separate modules, as shown, or may be implemented as a single module. Note that second telephone 106 at location B is shown without a VoIP device (e.g., it may have a standard public switched telephone network (PSTN) connection), or it may have the same configuration that is implemented at location A.

In some systems, voice (media) information and signal information may travel over different paths, referred to as the media path and the signaling path. The signaling path and the media path may be over different networks. The signal information is non-voice information used to place, route, and terminate the telephone call. The signaling path is between location A and VoIP service provider 140, while the media path is between location A and location B. Both location A and location B receive and/or transmit media information and signaling information for the telephone call.

VoIP is generally transported using Real-Time Transport Protocol (RTP) and Real Time Control Protocol (RTCP). RTP is an Internet protocol standard for management of real-time transmission of multimedia data.

RTP combines its data transport with Real Time Control Protocol (RTCP), which makes it possible to monitor data delivery for large multicast networks, so that packet loss may be detected and so that delay jitter may be compensated. Both RTP and RTCP work independently of the underlying transport layer and network layer protocols. Information in the RTP header tells the receiver how to reconstruct the data and describes how the codec bit streams are packetized. RTP generally runs on top of the User Datagram Protocol (UDP), although it can use other transport protocols. Both the Session Initiation Protocol (SIP) and H.323 use RTP for voice (media) communications.

RTP components include: a sequence number, which is used to detect lost packets; payload identification, which describes the specific media encoding so that it can be changed if it has to adapt to a variation in bandwidth; frame indication, which marks the beginning and end of each frame; source identification, which identifies the originator of the frame; and intramedia synchronization, which uses timestamps to detect different delay jitter within a single stream and compensate for it. RFC 3550 provides standards for RTP protocol. For example, at section 6.2.1, RFC 3550 states "A participant MAY mark another site inactive, or delete it if not yet valid, if no RTP or RTCP packet has been received for a small number of RTCP report intervals (5 is RECOMMENDED). This provides some robustness against packet loss. All sites must have the same value for this multiplier and must calculate roughly the same value for the RTCP report interval in order for this timeout to work properly. Therefore, this multiplier SHOULD be fixed for a particular profile."

RTCP components include: quality of service (QoS) feedback, which includes the numbers of lost packets, round-trip time, and jitter, so that the sources can adjust their data rates accordingly; session control, which uses the RTCP BYE packet to allow participants to indicate that they are leaving a session; identification, which includes a participant's name, e-mail address, and telephone number for the information of other participants; and intermedia synchronization, which enables the synchronization of separately transmitted audio and video streams.

Some VoIP systems use "comfort noise" to simulate the sound of a traditional telephone system. For such systems, rather than merely transmitting a silent voice packet, the system sends a comfort noise packet (or a series of comfort noise packets) indicating that comfort noise should be generated. Upon receipt of a comfort noise packet, the device at the receiving end generates sound mimicking the static of a traditional telephone connection.

In some circumstances, a single comfort noise packet may be generated, and comfort noise is generated until a media packet is received or the call is disconnected. In other circumstances, comfort noise packets are transmitted periodically during the silent interval.

Although VoIP provides a number of benefits over other communication systems such as the public switched telephone network (PSTN), some aspects are not optimal. For example, a software defect, faulty signaling, or problems at the user location (e.g., failure to properly replace the handset in the cradle) may cause hanging calls or mute calls on the system. Since the customer is billed for the time during which signaling information indicates that a call is active, hanging calls are problematic for VoIP service providers. If customers are billed for silent time, overall customer satisfaction drops. However, if the service provider agrees to remove the charge without being able to substantiate the customer claim that there was an actual hanging call, the doorway is open to customer fraud. In addition, network resources are consumed by the hung call, leading to sub-optimal call handling.

Some existing systems can be used to determine whether a particular network is operational, using signaling refresh techniques (e.g., reINVITE and/or OPTIONS). However, these existing systems are limited. First, the signaling path may be operational, but the media path may not, so that the signaling refresh system will not detect a problem. Second, there is overhead for the refresh operation, which reduces the available bandwidth for signaling transmissions on the signaling path. Finally, the signal refresh techniques are not applicable to systems in which the signaling and media paths are different.

BRIEF DESCRIPTION OF THE DRAWINGS

Like reference symbols in the various drawings indicate like elements.

DETAILED DESCRIPTION

Systems and techniques provided herein may provide for better VoIP service by identifying inactive media calls more effectively. In some embodiments, user-selected criteria may be used to distinguish between active calls and silent calls, based on detected media inactivity. This allows customers or other users to select more or less stringent requirements. As a result, customer bills more accurately reflect active connections, and resources are conserved.

Figure 1:
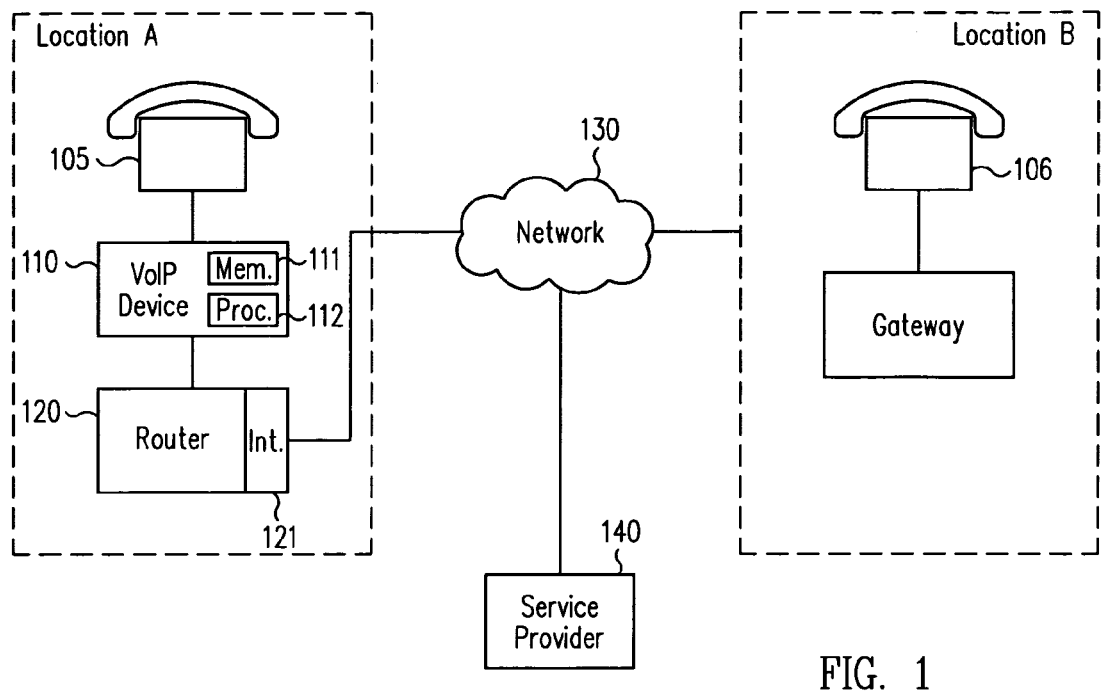
FIG. 1 is a schematic block diagram of a VoIP system, according to the prior art.
Figure 2:
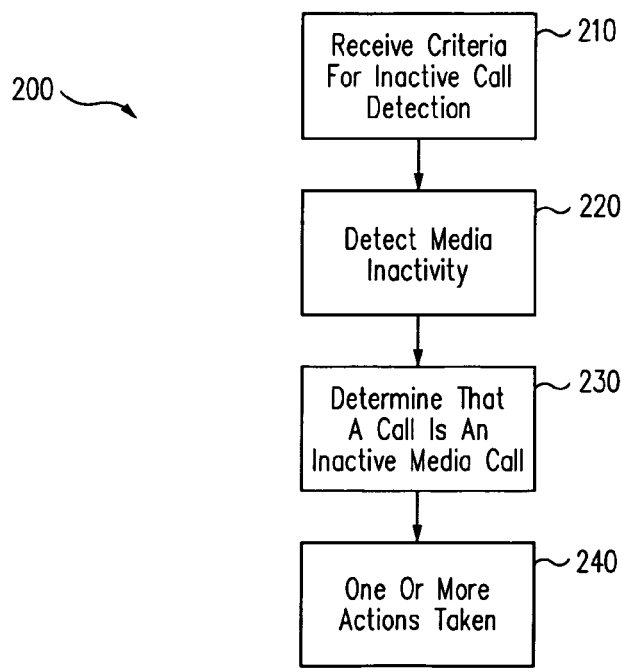
FIG. 2 is a method that may be used to detect inactive media calls, according to some embodiments.

FIG. 2 shows a method 200 that may be used to more effectively deal with the challenges posed by hanging calls. Herein, the phrase "hanging call" refers to a call that is an active call according to signaling information but is actually an inactive call. For example, a user may have disconnected the call but for some reason the disconnect information is lost in signaling path. As a result, the call is still treated as an active call. The systems and techniques provided herein detect media inactivity in calls that signaling information indicates as active.

At 210, one or more criteria may be received for media inactivity detection. The criteria may include an inactivity time corresponding to a designation as an inactive call, an inactivity detection mechanism, and the like. Exemplary inactive call detection criteria are described in more detail below. The criteria may be pre-set, may be automatically selected, and/or may be selected by one or more agents such as a user or system administrator.

At 220, media inactivity may be detected based on one or more of the inactive call detection criteria. Note that since inactivity is generally detected as the failure to detect activity, the mechanism for detecting inactive calls may detect packets corresponding to an active call, and inactivity may then be inferred from failure to detect active call packets for a particular amount of time. For example, for a particular inactivity detection mechanism, detection of a packet in a media path may be an indication of an active call. In response to detection of the packet, an inactivity timer (e.g., a counter) may be reset. Further discussion of media inactivity detection is included below.

At 230, the system may determine that a call is an inactive call based on the detected media inactivity. For example, the inactivity timer may reach a pre-selected value corresponding to an inactive call.

At 240, one or more actions may be taken based on determination that a call is an inactive call. For example, the system may terminate the call based on the determination that no media activity is occurring. Although call termination provides the maximum resource conservation, it may not be optimal (e.g., if the call was active but silent for longer than expected for an active call). Therefore, in some embodiments, the call may be tagged as an inactive call but not terminated at that time. By tagging the call, the service provider may make billing adjustments automatically, or in response to a customer complaint.

For systems in which features like "call hold" are available, the systems and techniques herein provide for suspending media inactivity detection when the features are activated, so that no false detection is done and hence no unwanted call disconnects occur. Call hold is implemented differently depending on the protocol being used. For example, the system may determine that the call is on hold using c=0.0.0.0 and/or a=sendonly/receiveonly/inactive attributes for SIP, or during H.450/ECS for H.323 protocol. The media inactivity detection feature will be reactivated when call resumes.

In some embodiments, the length of the call may also be monitored, and calls over a particular length may be tagged as "long calls." A call that is tagged as both an inactive call and a long call may be terminated by the service provider automatically or by an agent (e.g., an operator), while calls tagged only as "long" may remain connected (for example).

In embodiments in which a call is tagged as an inactive call after a particular inactivity time, one or more additional times may be used to terminate the call and/or take other action. For example, when the call is tagged as an inactive call after two minutes of silence, a second timer may be used to determine when there has been no media activity for a second longer time, such as ten minutes. In this case, the call may be tagged as a "long inactive call" and/or terminated after the second longer time.

In existing VoIP systems, media traffic is generally transmitted as Real Time Protocol (RTP) packets, frequently in conjunction with Real Time Control Protocol (RTPC) packets. In embodiments, RTP and/or RTCP traffic may be monitored to determine the call status as active/inactive.

As noted above, one or more criteria may be used to determine whether a call is an inactive call. One criterion is the duration during which a call status is inactive (referred to below as an "inactivity threshold time"). Additional criteria may be provided to determine which calls are determined to be inactive calls.

For example, in an embodiment using RTP and RTCP, the criteria may be by using RTP and/or RTCP status in any of the following combinations:

RTP Only
(1) Use receive only information to detect activity/inactivity
(2) Use send only information to detect activity/inactivity
(3) Use send or receive only information to detect activity/inactivity
(4) Use send and receive only information to detect activity/inactivity RTCP Only
Always receive only information used to detect activity/inactivity RTP and RTCP
Any of the four types listed above for RTP, and receive only information for RTCP RTP or RTCP
Any of the four types listed above for RTP or receive only information for RTCP.

Once the criteria are determined, a detection mechanism may be configured to use the criteria to detect media inactivity (inferred from media activity) and determine that a call is an inactive call.

In some circumstances, the media inactivity detection can be done at either the network receiving or sending end without doing granular check of whether the packet is a valid multimedia packet. A packet received from the remote end of the connection is considered as activity on the line whether or not it is a valid voice/media packet or a comfort noise packet. Inactivity may be determined based on the statistics from the network receive end for a given connection over a given period. In embodiments in which the contents of the packet need not be determined, packet processing with a digital signal processor (DSP) is not needed. Instead, the techniques may be implemented using simple library functions.

Figure 3A:
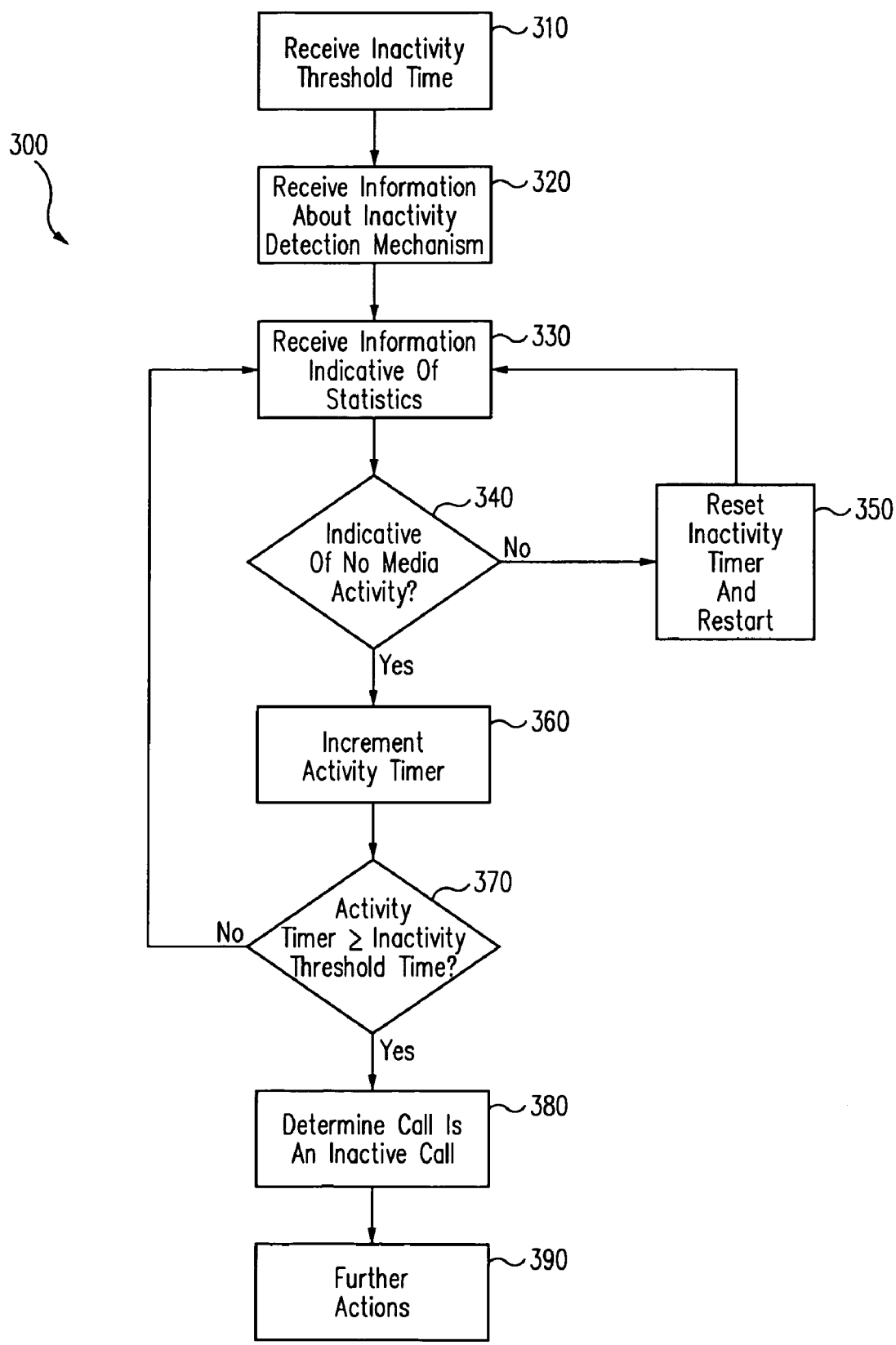
FIG. 3A is another method that may be used to detect inactive media calls, according to some embodiments.

For example, FIG. 3A shows an embodiment of a method 300 to detect inactive calls in a VoIP system using RTP and RTCP packets, without discriminating between active media packets and comfort noise packets.

At 310, a pre-determined inactivity threshold time corresponding to an inactive call may be received. At 320, information about the inactivity detection mechanism (e.g., executable instructions for implementing one or more inactivity detection mechanisms) is received as well. As noted above, inactivity can be detected a number of different ways using RTP packets only, RTCP packets only, or a combination thereof. The inactivity detection mechanism may be pre-set (i.e., the inactive call determination algorithm is set up in a particular way), may be selected automatically, or by an entity such as a system administrator or user.

At 330, information indicative of packet receive/transmit statistics may be received, according to the particular inactivity detection mechanism provided. For example, a number of packets transmitted and/or received over a time interval may be obtained from the VoIP gateway for the call.

At 340, the information indicative of receive/transmit statistics is used to determine whether the statistics indicate a silent interval (a time with no media activity). If they do not (e.g., the statistics for the time interval indicate that packets are being received), an inactivity timer is reset and restarted at 350. While signaling information indicates the call is an active call, additional information indicative of packet receive/transmit statistics continues to be received at 330, and the determination repeated.

If the statistics indicate a silent interval (e.g., no packets were received for the time interval), the inactivity timer is incremented at 360. The inactivity timer is compared to an inactivity time indicative of a hanging call at 370. If the value of the inactivity timer is less than the hanging call threshold, information indicative of packet receive/transmit statistics continues to be received at 330, and used to determine whether a silent interval is indicated 340.

If the value of the inactivity timer is greater than or equal to the inactive call threshold, the system determines that the call is an inactive call at 380. Further action is taken at 390; for example, the call is tagged as an inactive call, and/or terminated.

The method of FIG. 3A has the advantage of being simple to implement. As noted above, a DSP is not needed to implement a method using packet receive/transmit statistics and not the contents of the packets themselves. However, in some circumstances such a simple method may not be used.

For example, in a system incorporating Voice Activity Detection (VAD), when VAD is not enabled (VAD off), comfort noise packets are transmitted during silent intervals. Thus, when VAD is off, the method of FIG. 3A would not detect an inactive call, since the statistics would reflect the continuing reception of comfort noise packets.

For circumstances such as these, the contents of the packets themselves may be considered in determining whether a call is an active call. In order to do so, an algorithm may be implemented using a processor such as a DSP.

Figure 3B:
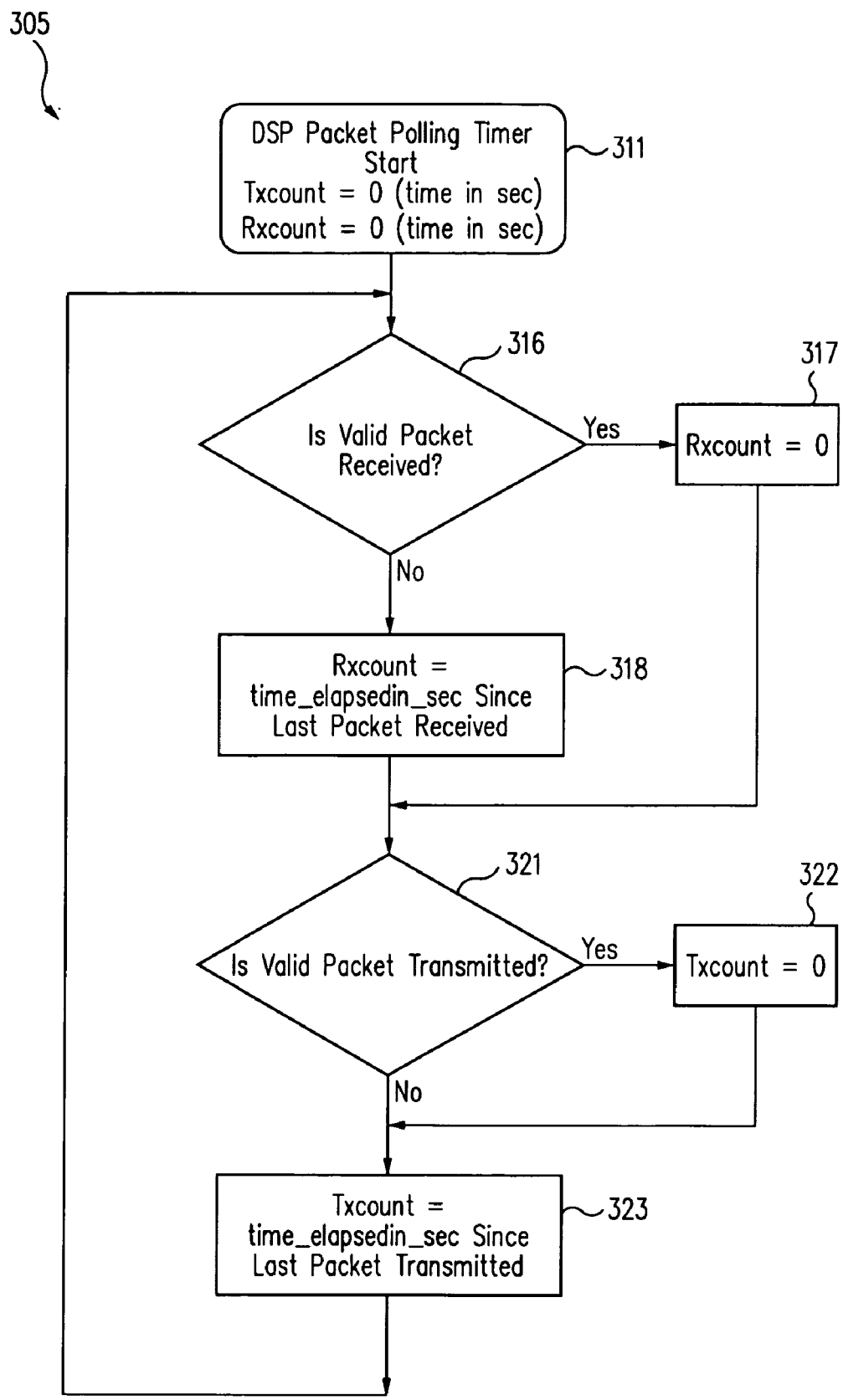
FIG. 3B is a method to detect media inactivity, using transmit and receive counters, according to some embodiments.

FIG. 3B shows a method 305 that may be used to determine whether a call is an active call by detecting media activity. Method 305 implements two counters referred to as Txcount (transmission counter, indicative of the elapsed time in seconds since the last packet was transmitted) and Rxcount (receive counter, indicative of the elapsed time in seconds since the last packet was received). At 311, a DSP packet polling timer starts. Txcount and Rxcount are both initialized to zero.

At 316, the system determines whether a valid packet is received. If it is, Rxcount is reset to zero at 317. If it is not, Rxcount is updated at 318; e.g., its value is incremented to be the time elapsed in seconds since the last packet was received. Similarly, at 321, the system determines whether a valid packet is transmitted. If it is, Txcount is reset to zero at 322. If it is not, Txcount is updated at 323; e.g., its value is incremented to be the time elapsed in seconds since the last packet was transmitted. The acts of method 305 are performed until the call is disconnected, or until one or both of Rxcount or Txcount exceeds a value at which the system takes further action (e.g., tags the call as an inactive call and/or disconnects the call).

Figure 4:
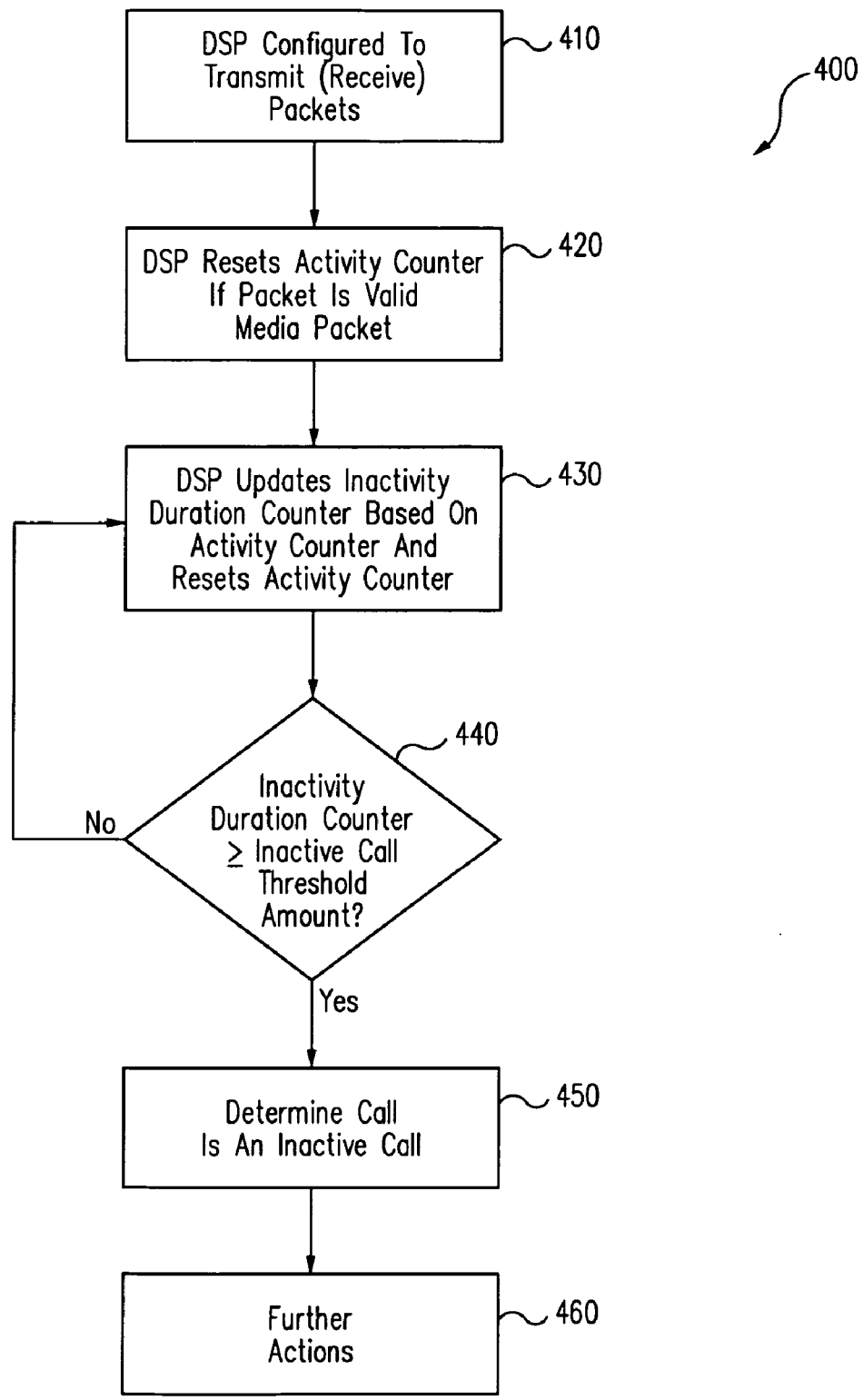
FIG. 4 is another method that may be used to detect inactive media calls, according to some embodiments.

As noted above, inactivity may be detected by monitoring packets at the receive end and/or transport end (depending on the selected detection mechanism). FIG. 4 shows a method 400 that may be used by a DSP associated with the transmitting (receiving) end of a particular VoIP communication. The DSP is configured to provide two counters through its statistics interfaces to its client (e.g., RTP). An activity counter is set to zero for a valid media packet transmitted (received) in the most recent polling interval. An inactivity duration counter displays a+ve value representative of the duration for which no valid packet has been transmitted.

At 410, a processor such as a DSP is configured to transmit (receive) packets for a particular VoIP communication and to implement media inactivity detection. At 420, when the DSP transmits (receives) a packet, it resets the activity counter to zero if the packet is a valid media packet for the VoIP communication, but not if the packet is not (e.g., if it is a comfort noise packet). At a later time, the DSP updates the inactivity duration counter depending on the whether the activity counter indicates that a valid packet was transmitted (received) during the time interval and resets the activity counter, at 430. For example, if a valid packet has been transmitted (received), the inactivity duration counter is reset to zero.

At 440, the DSP determines whether the inactivity duration counter is equal to or greater than an inactivity call threshold amount. If it is, the DSP determines that the call is an inactive call at 450, and may take further action at 460 (e.g., sending information indicative of the inactive call determination to the service provider so that the call can be terminated or tagged as an inactive call). If it is not, the DSP updates the inactivity duration counter at the next polling interval at 430. The process continues until the call is determined to be an inactive call, or until signaling information indicates that the call has been terminated.

Although the techniques outlined in FIGS. 3A, 3B, and 4 may allow for detection of calls with inactive media, other techniques may be used to improve the effectiveness of the detection and/or reduce the impact on system performance.

For example, in some embodiments, packets (such as RTP packets) may be generated with a header extension indicating whether the packet is a comfort noise packet or a media packet. The header extension may only be included in comfort noise packets or media packets, or may be included in both comfort noise packets and media packets. When the packets are received, quick offset parking may be used to identify the packet type, so that minimal additional effort is needed on the receiving end. That is, rather than needing codec-specific information to identify packets as valid media packets or comfort noise packets, an indicator may be included in a header extension that is independent of the codec (coder/decoder). Upon receipt, the packet may be parsed, and the indicator of packet type as a comfort noise packet may be determined by directly reading the offset.

For different existing codecs, comfort noise packets are sent differently. For example, some codecs send comfort noise packets continuously, which in others a single silence insertion description (SID) packet is sent. As noted above, when comfort noise packets are sent during a silent period, a DSP may be needed to examine the contents of the packets to determine whether they are active media packets or comfort noise packets.

By generating RTP packets with a header extension indicative of whether the packet is a comfort noise packet and/or indicative of whether the packet is a valid media packet, methods such as method 300 of FIG. 3A may be used to detect hanging calls. On the transmitting end, the transmit counters may be incremented/reset based on the identity of the packet being transmitted. On the receiving end, receive counters may be incremented/reset based on the content of the header extension. This technique may be particularly beneficial, since not all end points support RTCP generation.

Figure 5:
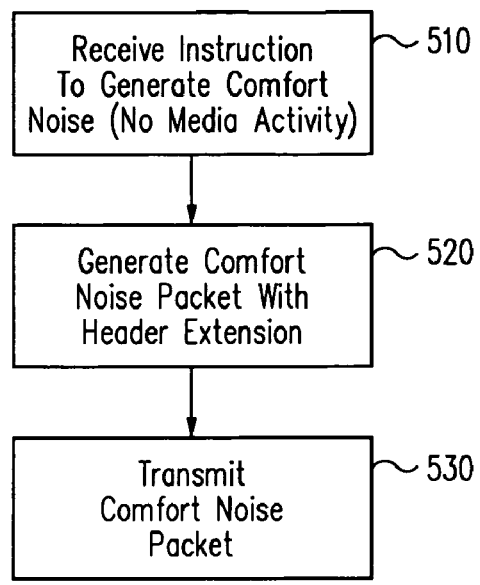
FIG. 5 is a method that may be used to incorporate RTP header extensions in media inactivity detection, according to some embodiments.

FIG. 5 shows a method 500 that may be used to generate an RTP packet with a header extension, and to use the header extension for media inactivity detection, according to some embodiments.

At the transmit part of the connection, at 510, a packet generator receives information indicating that a comfort noise packet is to be generated. At 520, the packet generator generates an extended RTP header including standard header information and header extension information indicating that the packet is a comfort noise packet. At 530, the packet is transmitted to the receive part of the connection. If media inactivity detection is implemented at the transmit part of the connection, the transmit counters are not reset to indicate transmission of an active packet. Subsequently, a packet receiver receives the comfort noise packet and, based on the header extension, does not reset receive counters (if media inactivity detection is implemented at the receive part of the connection).

Another technique that may be used is to enhance RTCP reports to include two more fields: tx counter and rx counter. The counters reflect the amount of silence in the period associated with the RTCP report. The counters would be reset to zero when a valid RTP packet is received from or sent to the DSP. VoIP gateways may then use the counters to detect inactive media calls.

Figure 6:
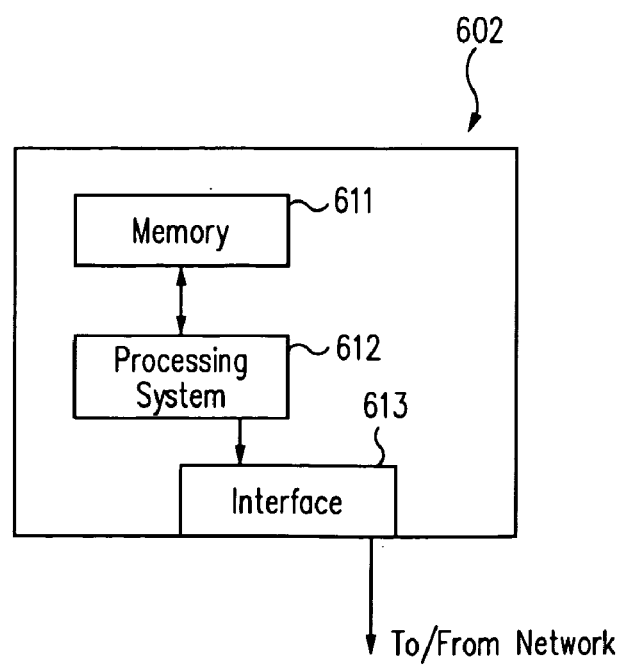
FIG. 6 is a block diagram of a device that may be used, according to some embodiments.

FIG. 6 shows a device 602 that may be used to implement the techniques described herein. Device 602 may be a VoIP gateway, or may be another VoIP device configured to implement the described techniques.

Device 602 includes a memory 611 to store data and/or instructions. The instructions may include codec instructions to decode received packets to determine media information included therein (e.g., to decode received packets to obtain voice information encoded therein). Similarly, the instructions may include instructions to encode media information to generate packets, as well as instructions to generate comfort noise packets.

The instructions may further include instructions to generate a header extension, as described above and illustrated in FIG. 5, and instructions that may be used to determine media inactivity as outlined above and shown in FIGS. 2-5.

Device 602 further includes a processing system 612, which may include a data processor, digital signal processor (DSP), and/or other processor type. Processing system 612 may execute instructions stored in memory 611. Processing 612 may also (or instead) implement the techniques described above directly. For example, when processing system 612 includes a DSP, the techniques may be performed at least partially using the DSP, rather than exclusively using software. In general, the above-described techniques may be implemented using hardware, software, firmware, or some combination.

Device 602 further comprises one or more interfaces such as an interface 613 to receive packets from a network and to transmit packets to the network. In some embodiments, device 602 transmits packets to and receives packets from the network via an additional device such as a router.

Device 602 may further include additional elements. For example, device 602 may include a digital to analog converter to convert decoded media information to analog form; for example, to decode voice information so that it can be used to drive a speaker in a telephone. Similarly, device 602 may include an analog to digital converter to convert analog media information into digital form so that it can be encoded for transmission over a network. For example, the analog to digital converter may convert an analog signal from the microphone of a telephone into associated digital voice information.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the word "means" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A method comprising:
   generating a packet at a transmit end of a particular connection according to real time transmission protocol (RTP), wherein generating the packet comprises generating a header including standard RTP header information and a header extension indicative of an identity of the packet as one of a valid media packet or a packet other than a valid media packet for the particular connection;
   transmitting the packet; and
   at the transmit end of the connection, generating an RTCP packet including a transmit counter indicative of a duration of media inactivity.

2. The method of claim 1, wherein the packet is a comfort noise packet, and wherein the header extension is indicative of the identity of the packet as a comfort noise packet.

3. The method of claim 1, further comprising generating a valid media packet at the transmit end of the particular connection according to real time transmission protocol, and further comprising adjusting an inactivity timer based thereon.

4. The method of claim 1, further comprising comparing an inactivity timer at the transmit end of the connection to an associated inactivity threshold amount.

5. An article comprising a machine-readable medium embodying information indicative of instructions that when performed by one or more machines result in operations comprising:

generating a packet at a transmit end of a particular connection according to real time transmission protocol (RTP), wherein generating the packet comprises generating a header including standard RTP header information and a header extension indicative of an identity of the packet as one of a valid media packet or a packet other than a valid media packet for the particular connection;

transmitting the packet; and at the transmit end of the connection, generating an RTCP packet including a transmit counter indicative of a duration of media inactivity.

6. The article of claim 5, wherein the packet is a comfort noise packet, and wherein the header extension is indicative of the identity of the packet as a comfort noise packet.

7. The article of claim 5, further comprising generating a valid media packet at the transmit end of the particular connection according to real time transmission protocol, and further comprising adjusting an inactivity timer based thereon.

8. The article of claim 5, further comprising comparing an inactivity timer at the transmit end of the connection to an associated inactivity threshold amount.

9. A system comprising:

a media gateway including memory configured to store instructions to transmit and receive a plurality of packets including a first packet for a particular media connection, the media gateway further including a processor configured to process the instructions, wherein the instructions cause one or more machines to perform operations including:

generating the first packet at a transmit end of the particular connection according to real time transmission protocol (RTP), wherein generating the first packet comprises generating a header including standard RTP header information and a header extension indicative of an identity of the first packet as one of a valid media packet or a packet other than a valid media packet for the particular connection; and at the transmit end of the connection, generating an RTCP packet including a transmit counter indicative of a duration of media inactivity, wherein the media gateway further comprises a packet transmitter configured to transmit the plurality of packets for the particular media connection, and wherein the packet transmitter comprises a network interface.

10. The system of claim 9, wherein the first packet is a comfort noise packet, and wherein the header extension is indicative of the identity of the packet as a comfort noise packet.

11. The system of claim 9, wherein the operations further comprise generating a valid media packet at the transmit end of the particular connection according to real time transmission protocol, and further comprise adjusting an inactivity timer based thereon.

12. A system comprising:

means for generating a first packet at a transmit end of a particular media connection according to real time transmission protocol (RTP), wherein generating the first packet comprises generating a header including standard RTP header information and a header extension indicative of an identity of the first packet as one of a valid media packet or a packet other than a valid media packet for the particular connection;

means for transmitting the first packet to a receiving gateway of the particular media connection; and means for generating an RTCP packet including a transmit counter indicative of a duration of media inactivity at the transmit end of the connection.

13. The system of claim 12, wherein the first packet is a comfort noise packet, and wherein the header extension is indicative of the identity of the packet as a comfort noise packet.

14. The system of claim 12, further comprising means for generating a valid media packet at the transmit end of the particular connection according to real time transmission protocol; and means for adjusting an inactivity timer based on generating the valid media packet.

15. A method of determining media inactivity, comprising:

initiating a transmit count timer and a receive count timer at an initial time for a particular call;

if a packet is transmitted, resetting the transmit count timer if the packet is a valid media packet but not if the packet is a comfort noise packet;

if a packet is received, resetting the receive counter timer if the packet is a valid media packet but not if the packet is a comfort noise packet;

determining whether one or both of the transmit count timer and the receive count timer exceed a media inactivity threshold; and determining that the particular call is an inactive call if one or both of the transmit count timer and the receive count timer exceed the media inactivity threshold.

16. The method of claim 15, wherein determining that the particular call is an inactive call if one or both of the transmit count timer and the receive count timer exceed the media inactivity threshold comprises determining that the particular call is an inactive call only if both the transmit count timer and the receive count timer exceed the media inactivity threshold.

17. The method of claim 15, further comprising tagging the particular call as an inactive call but not terminating the call based on determining that the particular call is an inactive call.

18. The method of claim 15, further comprising tagging the particular call as an inactive call and terminating the call based on determining that the particular call is an inactive call.

19. The method of claim 15, further comprising generating an RTCP report at a particular time including information indicative of a current value of the transmit counter and the receive counter.

20. A system comprising:

a media gateway including memory configured to store instructions to transmit and receive a plurality of packets including a first packet for a particular media connection, the media gateway further including a processor configured to process the instructions, wherein the instructions cause one or more machines to perform operations including:

receiving the first packet at a receive end of the particular connection according to real time transmission protocol (RTP), wherein receiving the first packet comprises processing a header including standard RTP header information and a header extension indicative of an identity of the first packet as one of a valid media packet or a packet other than a valid media packet for the particular connection; and receiving an RTCP packet including a transmit counter indicative of a duration of media inactivity, wherein the media gateway further comprises a packet receiver configured to receive the plurality of packets for the particular media connection, and wherein the packet receiver comprises a network interface.

21. The system of claim 20, wherein the first packet is a comfort noise packet, and wherein the header extension is indicative of the identity of the packet as a comfort noise packet.

22. The system of claim 20, wherein the operations further comprising determining that the first packet is not a valid media packet at the receive end of the particular connection according to real time transmission protocol, and further comprising adjusting an inactivity timer based thereon.

23. A system comprising:

means for receiving a first packet at a receive end of a particular media connection according to real time transmission protocol (RTP), wherein receiving the first packet comprises processing a header including standard RTP header information and a header extension indicative of an identity of the first packet as one of a valid media packet or a packet other than a valid media packet for the particular connection;

means for receiving an RTCP packet including a transmit counter indicative of a duration of media inactivity; and means for receiving the first packet from a transmit gateway of the particular media connection.

* * * * *